US009475583B2

(12) United States Patent
Burd

(10) Patent No.: US 9,475,583 B2
(45) Date of Patent: Oct. 25, 2016

(54) LOCATION AND SUPPORT SYSTEM FOR AIRCRAFT GALLEY APPLIANCE INSERTS

(71) Applicant: B/E AEROSPACE, INC., Wellington, FL (US)

(72) Inventor: Peter John Leslie Burd, Carmarthenshire (GB)

(73) Assignee: B/E AEROSPACE, INC., Wellington, FL (US)

( * ) Notice: Subject to any disclaimer, the term of this patent is extended or adjusted under 35 U.S.C. 154(b) by 57 days.

(21) Appl. No.: 14/303,207

(22) Filed: Jun. 12, 2014

(65) Prior Publication Data
US 2014/0368100 A1 Dec. 18, 2014

Related U.S. Application Data

(60) Provisional application No. 61/836,451, filed on Jun. 18, 2013.

(51) Int. Cl.
*B64D 11/04* (2006.01)
*A47B 77/04* (2006.01)
*A47B 81/00* (2006.01)

(52) U.S. Cl.
CPC ............. *B64D 11/04* (2013.01); *A47B 77/04* (2013.01); *A47B 81/00* (2013.01); *Y02T 50/46* (2013.01)

(58) Field of Classification Search
CPC ...... A47B 77/04; A47B 81/00; B64D 11/04; B64C 11/00; Y02T 50/46
USPC ............... 244/118.5; 312/111, 236, 237, 245
See application file for complete search history.

(56) References Cited

U.S. PATENT DOCUMENTS

| 2,992,315 | A | * | 7/1961 | McDonnold | F24C 15/102 |
| | | | | | 126/214 A |
| 3,256,053 | A | * | 6/1966 | Levenberg | A47B 47/03 |
| | | | | | 312/140.1 |
| 4,456,206 | A | | 6/1984 | Tijssen | |
| 5,083,727 | A | * | 1/1992 | Pompei | B64D 11/0007 |
| | | | | | 105/345 |

(Continued)

FOREIGN PATENT DOCUMENTS

WO   WO2010/142420   * 12/2010 ............. B64D 11/04

OTHER PUBLICATIONS

International Search Report, Jun. 13, 2013.
(Continued)

*Primary Examiner* — Brian M O'Hara
*Assistant Examiner* — Assres H Woldemaryam
(74) *Attorney, Agent, or Firm* — Fulwider Patton LLP

(57) ABSTRACT

A location and support system for installation of an aircraft galley insert case for location and attachment of an aircraft galley insert in an aircraft galley monument includes a floating stabilizer connector fixedly mounted to an upper surface of the aircraft galley insert case, and a floating receiver shelf engagement insert fixedly mounted to an attachment slot in an upper portion of a compartment in the aircraft galley monument for receiving the aircraft galley insert case. The floating receiver shelf engagement insert includes a slotted portion configured to removably receive the floating stabilizer connector. The aircraft galley insert may also include a plurality of ceramic spacers embedded in formed insulation.

15 Claims, 4 Drawing Sheets

(56) References Cited

U.S. PATENT DOCUMENTS

| | | | | |
|---|---|---|---|---|
| 7,565,903 | B2 * | 7/2009 | Sasaki | F24C 15/322 126/20.1 |
| 7,780,114 | B2 * | 8/2010 | Doebertin | B64D 11/04 244/118.5 |
| 7,954,761 | B2 | 6/2011 | Johnson et al. | |
| 8,074,842 | B2 * | 12/2011 | Edwards | B67D 1/06 222/129.1 |
| 8,087,611 | B2 | 1/2012 | Arnold et al. | |
| 8,387,916 | B2 | 3/2013 | Baatz et al. | |
| 8,814,087 | B2 * | 8/2014 | Koschberg | B64D 11/04 244/118.5 |
| 2006/0145442 | A1 * | 7/2006 | Van Loon | A47B 51/00 280/79.7 |
| 2007/0228216 | A1 * | 10/2007 | Wenstrom | B64D 11/04 244/118.5 |
| 2008/0129159 | A1 * | 6/2008 | Johnson | A47B 31/02 312/111 |
| 2008/0150406 | A1 * | 6/2008 | Arnold | B64D 11/04 312/237 |
| 2009/0314889 | A1 * | 12/2009 | Baatz | B64D 11/0007 244/118.5 |
| 2009/0321574 | A1 | 12/2009 | Erickson et al. | |
| 2010/0140398 | A1 * | 6/2010 | Cunningham | A47J 31/005 244/118.5 |
| 2012/0085862 | A1 | 4/2012 | Pangalila | |
| 2012/0203376 | A1 * | 8/2012 | Savage | B25H 3/00 700/214 |
| 2012/0217342 | A1 | 8/2012 | Tan et al. | |
| 2012/0217343 | A1 | 8/2012 | Koschberg et al. | |
| 2012/0285335 | A1 | 11/2012 | Cunningham et al. | |
| 2013/0048264 | A1 * | 2/2013 | Lu | G05D 23/00 165/287 |
| 2013/0248652 | A1 * | 9/2013 | Godecker | B64D 11/04 244/118.5 |
| 2013/0255656 | A1 * | 10/2013 | Schootstra | F24C 15/026 126/190 |

OTHER PUBLICATIONS

International Search Report, Oct. 13, 2014, 5 pages, from PCT/US2014/042815 published as WO 2014/205010 on Dec. 24, 2014.

* cited by examiner

LOCATION AND SUPPORT SYSTEM FOR AIRCRAFT GALLEY APPLIANCE INSERTS

CROSS-REFERENCES TO RELATED APPLICATIONS

This application is based upon and claims priority from U.S. Provisional Application No. 61/836,451, filed Jun. 18, 2013, incorporated by reference in its entirety.

This invention relates generally to transport aircraft galley systems, and more particularly relates to a system for locating and attaching a galley insert or galley appliance within an aircraft galley.

BACKGROUND

Aircraft galley systems for commercial aircraft with in-flight catering services typically incorporate self-contained refrigeration units that are cooled to prevent spoilage of food prior to distribution to passengers, and to keep beverages at desired serving temperatures, as well as separate ovens for heating food in the preparation of hot meals to be served aboard aircraft. Currently space must be allocated for each of the heating and cooling devices separately, either in the same galley or in different galleys.

One known modular aircraft galley utilizes several vertical and horizontal structural elements for accommodating slide-in devices or items of equipment such as galley inserts or galley appliances. The galley includes structural elements that form an essentially unchangeable basic element providing connection elements for the mechanical connection and interfacing of the slide-in devices or items of equipment, so that various kinds of the slide-in devices or items of equipment can be interchanged at various locations. Such modular aircraft galley systems typically use the outer case of a galley insert or galley appliance, such as an oven, refrigerator or other such device, as the principal mechanism for locating the galley insert or galley appliance in an inner cavity or liner of a galley.

It would be desirable to provide a location and support system for aircraft galley appliance inserts that permits reduction of weight by removing structural components of a galley insert or appliance. It would also be desirable to provide a location and support system for aircraft galley appliance inserts that permits creation of additional space by placing galley inserts or appliances in close proximity. It would also be desirable to provide a location and support system for aircraft galley appliance inserts that permits integration of appliances with an existing galley monument structure. The present invention meets these and other needs.

SUMMARY OF THE INVENTION

Briefly, and in general terms, the present invention provides for a location and support system for installation of an aircraft galley insert in an aircraft galley monument, that allows for a reduction in the weight of a galley insert or appliance case by removing the need for sufficient rigidity to be self supporting, and provides sufficient support to prevent the galley insert or appliance contacting and therefore applying a load to the side or dividing walls of the monument to which the galley insert or appliance is attached. The location and support system of the present invention allows sufficient movement to prevent the monument imposing damaging loads on the galley insert or appliance, and allows a galley insert or appliance to be installed and uninstalled as a conventional line replaceable unit without the need for tools.

The location and support system of the present invention includes two primary parts, one rigid part fixedly attached to a galley insert or appliance case, and one flexible one part that is fixedly attached to the galley monument. The location and support system of the present invention allows interchangeability within a given location, and facilitates placing galley insert or appliances closer together without the danger of contact.

Accordingly, the present invention provides for a location and support system for installation of a galley appliance in a compartment of an aircraft galley monument for accommodation of the galley appliance. In a presently preferred aspect, the location and support system includes a galley appliance case configured to be received in the galley appliance compartment, and an aircraft galley monument shelf disposed in the galley appliance compartment of the aircraft galley monument including a primary attachment slot. The galley appliance case preferably has an upper surface including a floating stabilizer connector fixedly mounted to the upper surface of the galley appliance case, and the primary attachment slot is configured to movably receive the floating stabilizer connector for location and attachment of a galley appliance to prevent excessive movement of the galley appliance case when a galley appliance is installed in the aircraft galley monument. In another presently preferred aspect, the primary attachment slot of the aircraft galley monument shelf includes a floating receiver shelf engagement insert configured to movably receive the floating stabilizer connector. In another presently preferred aspect, the galley appliance case includes vane features configured to locate the galley appliance case in sides of the galley appliance compartment.

In another presently preferred aspect, the galley appliance comprises an oven assembly, which may include a control panel provided at a front portion of the aircraft galley monument. In another presently preferred aspect, the galley appliance case may include oven door fascia. In another presently preferred aspect, the galley appliance case may include lower mounting rails. In another presently preferred aspect, the galley appliance case may include a duct assembly removably mounted to a rear portion of the galley appliance case. In another presently preferred aspect, the galley appliance case may include a plurality of ceramic spacers embedded in formed insulation.

The present invention also provides for an aircraft galley monument including an aircraft galley monument structure including galley insert compartment having a shelf including primary attachment slot, and a galley insert case configured to removably receive a galley insert. The galley insert case preferably has an upper surface including a floating stabilizer connector fixedly mounted to the upper surface of the galley insert case, and the floating stabilizer connector is movably received in the primary attachment slot to prevent excessive movement of the galley insert case when the galley insert is installed in the aircraft galley monument.

In another presently preferred aspect, the galley insert case further comprises lower mounting rails. In another presently preferred aspect, the galley insert case further comprises a duct assembly removably mounted to a rear portion of the galley insert case. In another presently preferred aspect, the galley insert case further comprises vane features for locating the galley insert case in sides of the galley insert compartment. In another presently preferred aspect, the shelf is located in an upper portion of the compartment of the aircraft galley monument structure.

In another presently preferred aspect, the aircraft galley monument further includes an upper portion including space for accommodation of at least one standard units. In another presently preferred aspect, the aircraft galley monument further comprises an insert protocol adapter connector unit. In another presently preferred aspect, the aircraft galley monument further comprises air intake fascia configured to provide a flow path for air flow for ventilation of the galley insert. In another presently preferred aspect, the galley insert is an oven assembly, and a control panel for the oven assembly is provided on a front portion of the aircraft galley monument. The galley insert case may further include oven door fascia, and may further include a plurality of ceramic spacers embedded in formed insulation.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
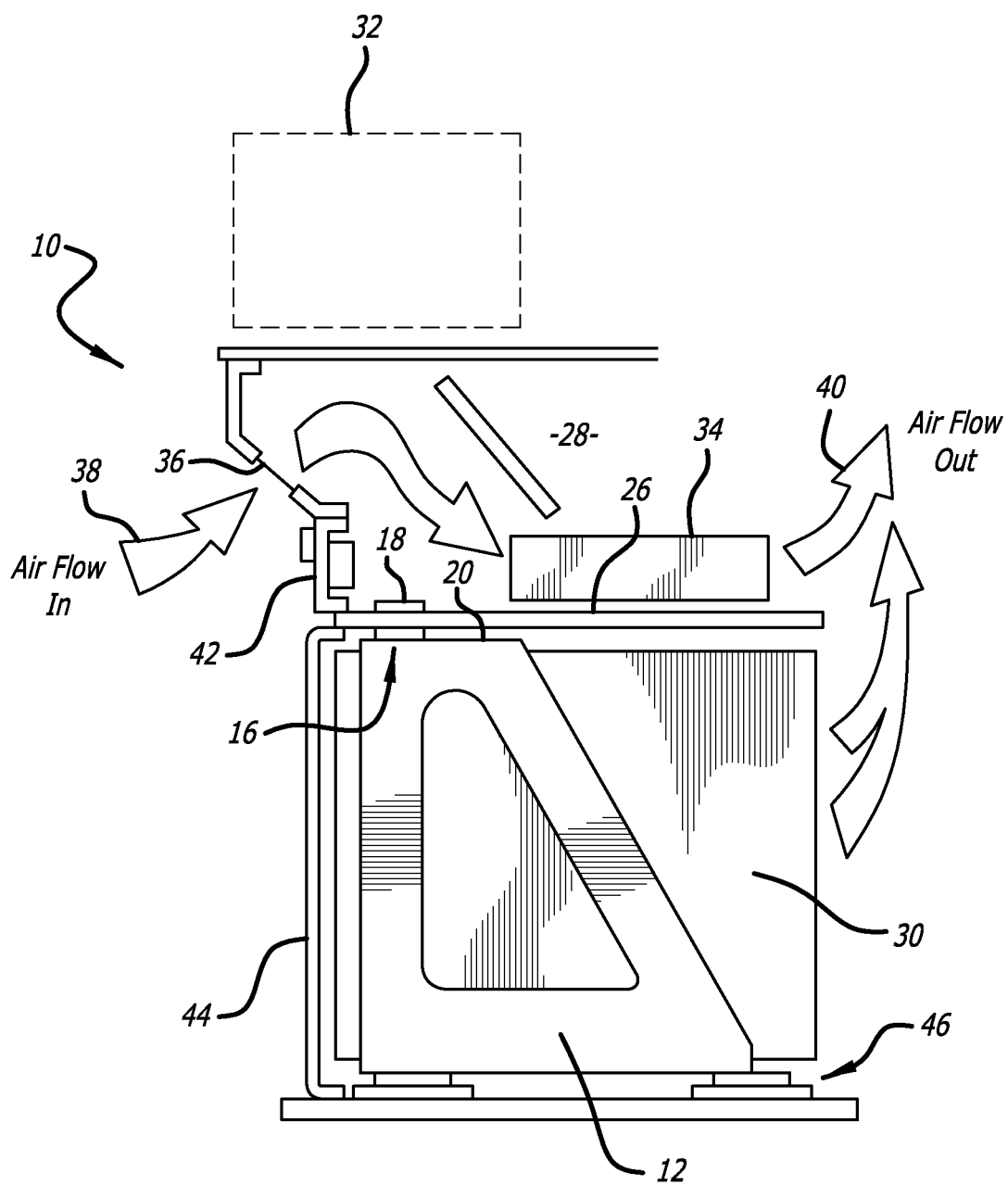
FIG. 1 is a cross-sectional view through a portion of an aircraft galley monument with a galley insert or appliance such as an oven assembly installed in the aircraft galley monument with the location and support system according to the present invention.
Figure 2:
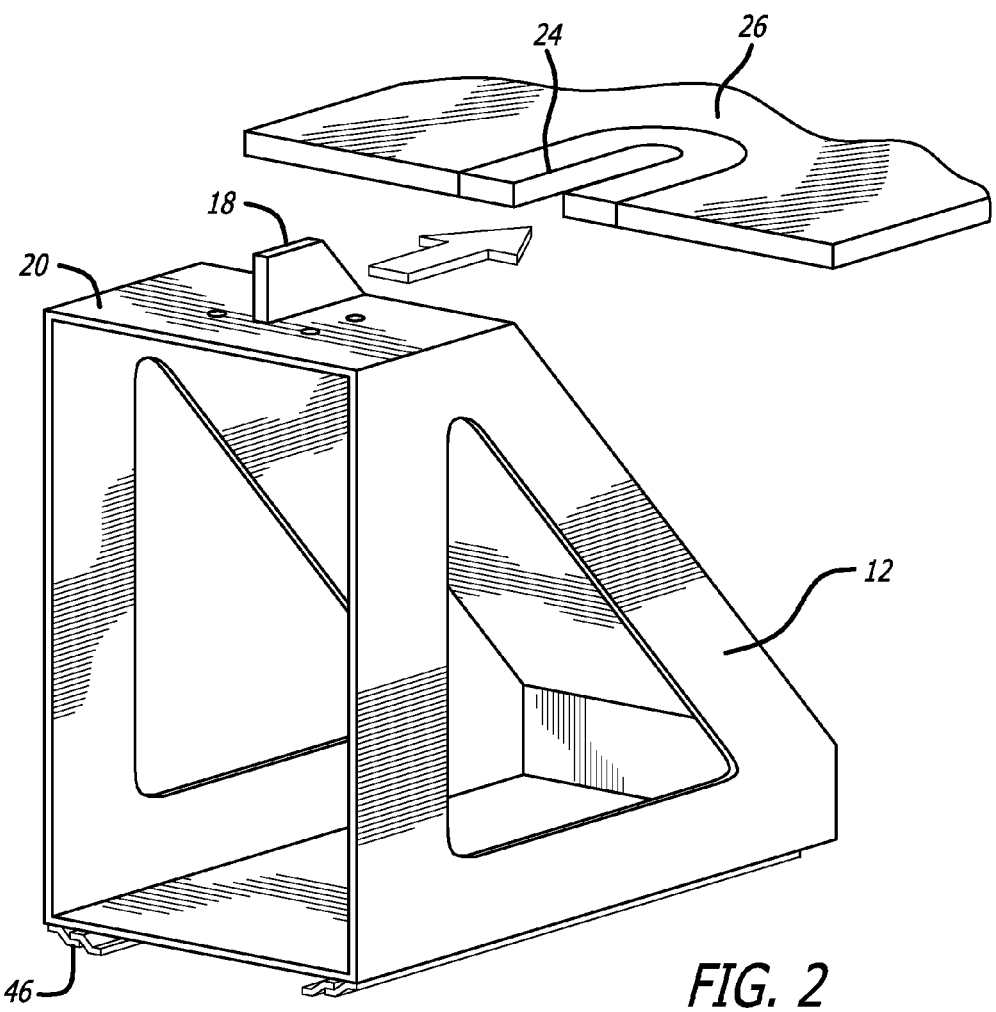
FIG. 2 is an exploded view of a sub-frame and mounting assembly of a location and support system of FIG. 1.
Figure 3:
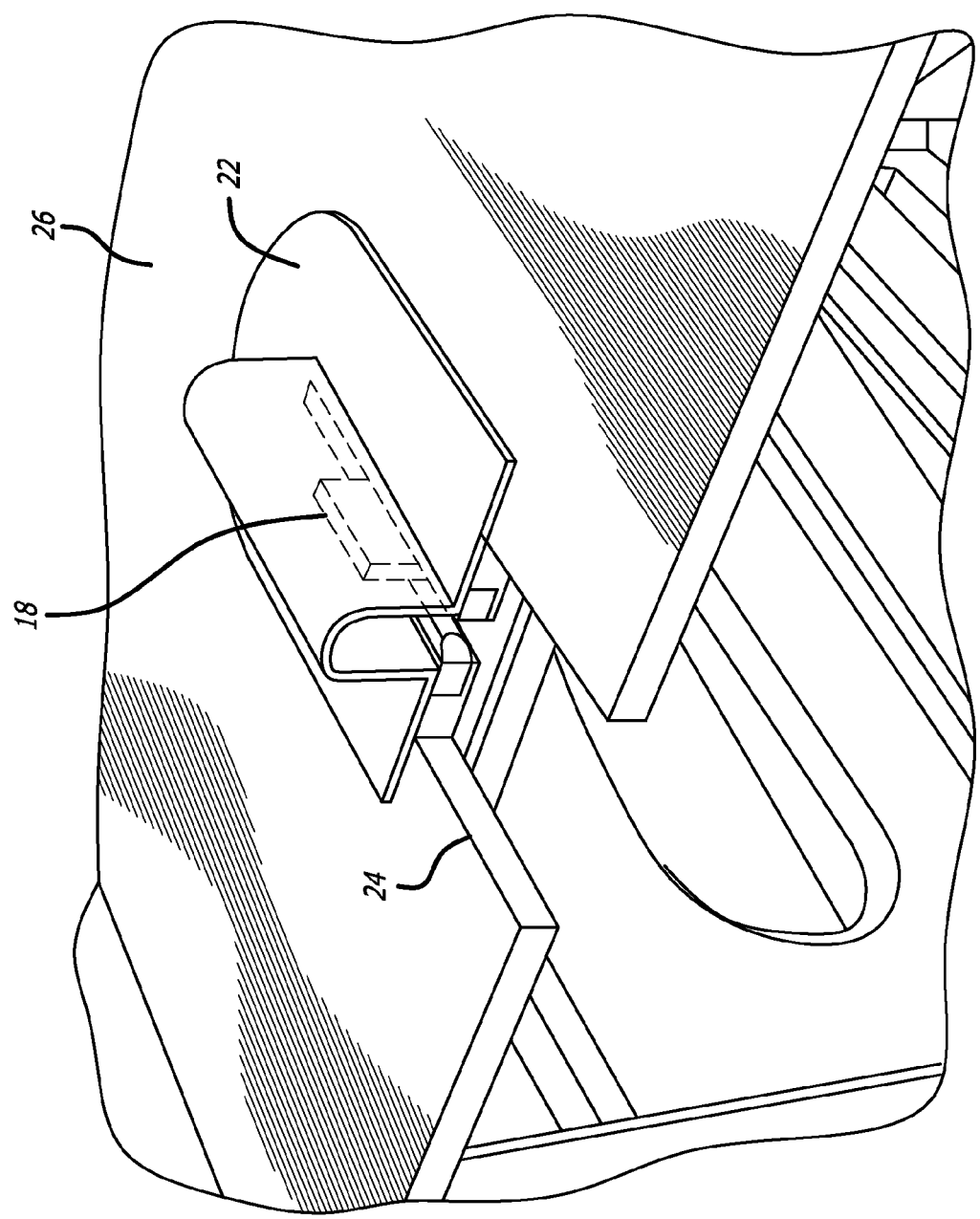
FIG. 3 is an enlarged detail perspective view of a preferred embodiment of a mounting assembly of the location and support system of FIG. 1.

Referring to the drawings, which are provided for purposes of illustration and by way of example, the present invention provides for a location and support system for aircraft galley appliance inserts for preventing unacceptable loads from being imposed on the aircraft galley inserts or appliances by movement of the galley structure, and for preventing contact or interference with loading of adjacent galley inserts or appliances, or intermediate or structural galley walls, dividers, separators or other surfaces.

As is illustrated in FIG. 1, showing a portion of an aircraft galley monument 10 with a galley insert or appliance case, sub-frame, chassis or structural inner liner 12 installed in the aircraft galley monument, the present invention provides for a location and support system for mounting of aircraft galley appliance inserts, such as an oven assembly, for example. An upper surface of the galley insert or appliance case, sub-frame, chassis or structural inner liner advantageously includes a floating stabilizer fitting or assembly, flutter assembly, floating stabilizer fitting point or flutter point 16 configured to prevent excessive movement of the galley insert or appliance case, sub-frame, chassis or structural inner liner when a galley insert or appliance is installed in an aircraft galley monument. The floating stabilizer fitting point or flutter point is formed of two main parts, including a floating stabilizer connector or fixed "sharks fin" connector 18 fixedly mounted or fitted to the galley insert or appliance case upper surface 20, and a "floating receiver" shelf engagement insert or doubler 22 incorporated into a primary attachment slot 24 on a shelf 26 of an upper portion of a compartment 28 of the aircraft galley monument structure for accommodation of the galley insert or appliance case, sub-frame or chassis, and for location and attachment of a galley insert or appliance, such as an oven assembly 30, for example, in the sub-frame, galley insert or appliance case, or structural inner liner. The "floating receiver" shelf engagement insert or doubler preferably allows movement of the fixed "sharks fin" connector, and consequently the sub-frame, galley insert or appliance case, or structural inner liner installed with the location and support system of the invention, about 25 mm in a horizontal forward-aft direction, about 10 mm in a vertical direction, and about 10 mm in a horizontal direction perpendicular to the horizontal forward-aft direction.

An upper portion of the aircraft galley monument typically includes space for accommodation of one or more standard units 32, and the aircraft galley monument typically also includes an insert protocol adapter connector unit (iPAC) 34, air intake fascia 36 allowing for ventilation of a galley insert or appliance, providing a flow path for air flow in 38 and air flow out 40. A control panel 42 is typically also provided on a front portion of the aircraft galley monument. When the galley insert or appliance is an oven assembly, the galley insert or appliance case, sub-frame or chassis typically also typically includes oven door fascia 44 and lower mounting rails, shelf rails or guide bars 46.

Figure 4:
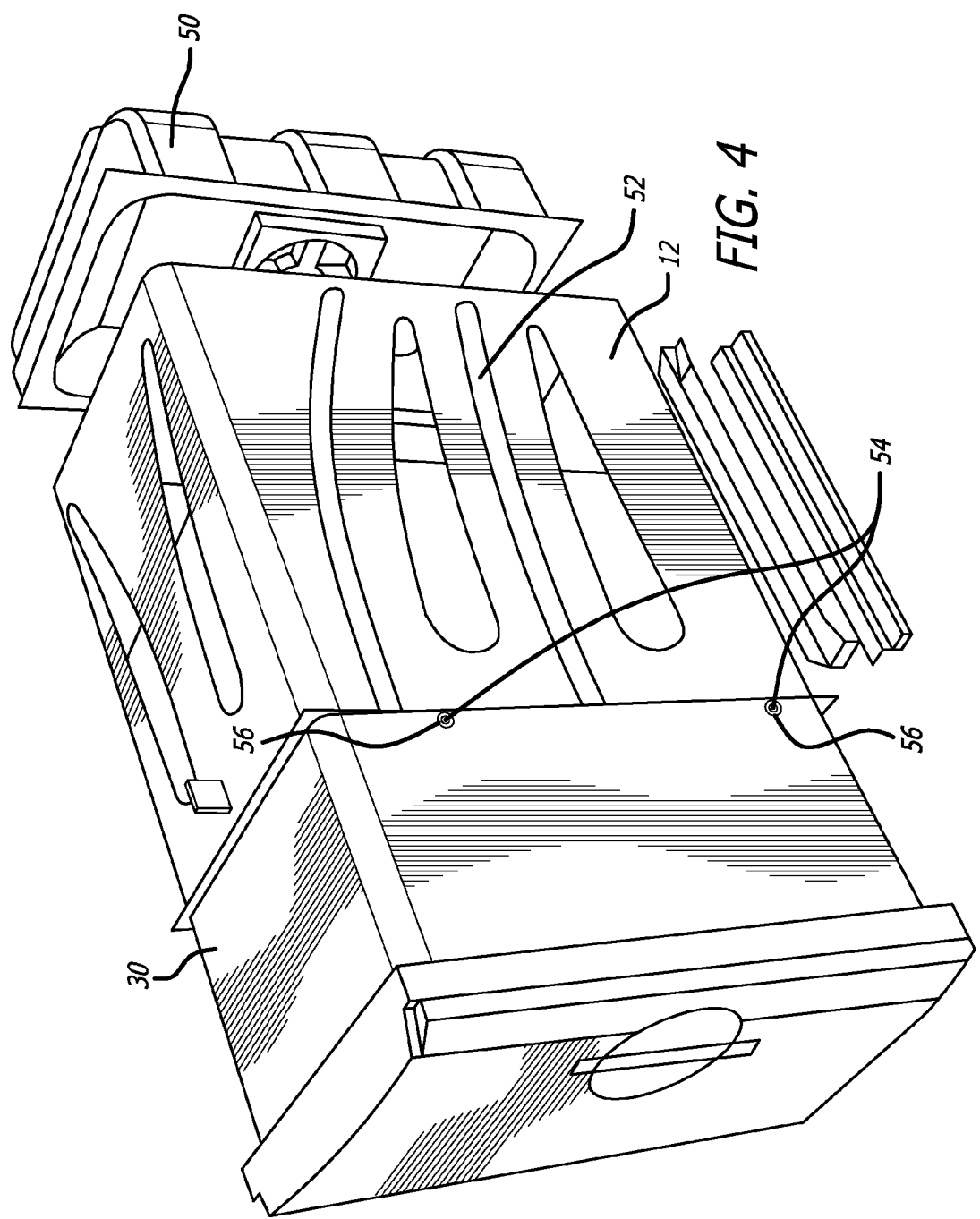
FIG. 4 is an exploded perspective view of mounting of an oven assembly galley insert or appliance with the location and support system of FIG. 1.

As is illustrated in FIG. 4, a duct assembly 50 may also be removably mounted to a rear portion of the sub-frame, galley insert or appliance case, or structural inner liner, which typically also includes vane features 52 for locating the sub-frame, galley insert or appliance case, or structural inner liner in sides of the galley insert or appliance compartment of the aircraft galley monument structure. When the galley insert or appliance is an oven assembly, ceramic spacers 54 optionally also may be embedded in "formed" insulation 56 on the outer surface of the oven assembly.

The floating stabilizer fitting or flutter assembly is configured to prevent contact with or interfere with loading of adjacent galley inserts or appliances, or intermediate or structural galley walls, dividers, separators or other surfaces. Likewise by its floating nature, unacceptable loads are not imposed on the galley insert by movement of the galley structure.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A system for installation of a galley appliance in a compartment of an aircraft galley monument, the aircraft galley monument including a galley appliance compartment for accommodation of the galley appliance, the system comprising:

a galley appliance case configured to receive a galley appliance, said galley appliance case being configured to be received in a galley appliance compartment of an aircraft galley monument, said galley appliance case having an upper surface including a floating stabilizer connector fixedly mounted to the upper surface of the galley appliance case, and said galley appliance case including a duct assembly removably mounted to a rear of the galley appliance case; and an aircraft galley monument shelf disposed in the galley appliance compartment of the aircraft galley monument, said aircraft galley monument shelf including a floating receiver shelf engagement insert, said floating receiver shelf engagement insert including a primary attachment slot configured to movably receive said floating stabilizer connector for location and attachment of the galley appliance to prevent excessive movement of the galley appliance case when the galley appliance is installed in the aircraft galley monument, and wherein said aircraft galley monument further comprises air intake fascia configured to provide a flow path for air flow for ventilation of the galley appliance, and wherein the galley appliance comprises an oven assembly.

2. The system of claim 1, wherein said galley appliance case includes vane features configured to locate said galley appliance case in sides of the galley appliance compartment.

3. The system of claim 1, wherein said oven assembly includes a control panel provided at a front portion of the aircraft galley monument.

4. The system of claim 1, wherein said galley appliance case further comprises oven door fascia.

5. The system of claim 1, wherein said galley appliance case further comprises lower mounting rails.

6. The system of claim 1, wherein said oven assembly includes a plurality of ceramic spacers embedded in insulation.

7. An aircraft galley monument, comprising:
an aircraft galley monument structure including a galley insert compartment, said galley insert compartment having a shelf including a floating receiver shelf engagement insert, said floating receiver shelf engagement insert including primary attachment slot; and
a galley insert case configured to removably receive a galley insert, said galley insert case having an upper surface including a floating stabilizer connector fixedly mounted to the upper surface of the galley insert case, said floating stabilizer connector being movably received in said primary attachment slot, said floating stabilizer connector being configured to prevent excessive movement of the galley insert case when the galley insert is installed in the aircraft galley monument, and wherein said galley insert case includes a duct assembly removably mounted to a rear of the galley insert case, and air intake fascia configured to provide a flow path for air flow for ventilation of the galley insert.

8. The aircraft galley monument of claim 7, wherein said galley insert case further comprises lower mounting rails.

9. The aircraft galley monument of claim 7, wherein said galley insert case further comprises vane features for locating the galley insert case in sides of the galley insert compartment.

10. The aircraft galley monument of claim 7, wherein said shelf is located in an upper portion of the compartment of the aircraft galley monument structure.

11. The aircraft galley monument of claim 7, wherein said aircraft galley monument further comprises an upper portion including space for accommodation of at least one standard units.

12. The aircraft galley monument of claim 7, wherein said aircraft galley monument further comprises an insert protocol adapter connector unit.

13. The aircraft galley monument of claim 7, wherein said galley insert is an oven assembly, and a control panel for the oven assembly is provided on a front portion of the aircraft galley monument.

14. The aircraft galley monument of claim 13, wherein said galley insert case further comprises oven door fascia.

15. An aircraft galley monument, comprising:
an aircraft galley monument structure including a galley insert compartment, said galley insert compartment having a shelf including a floating receiver shelf engagement insert, said floating receiver shelf engagement insert including primary attachment slot; and
a galley insert case configured to removably receive a galley insert, said galley insert case having an upper surface including a floating stabilizer connector fixedly mounted to the upper surface of the galley insert case, said floating stabilizer connector being movably received in said primary attachment slot, said floating stabilizer connector being configured to prevent excessive movement of the galley insert case when the galley insert is installed in the aircraft galley monument, wherein said galley insert is an oven assembly, said oven assembly includes a plurality of ceramic spacers embedded in insulation, and wherein said galley insert case includes a duct assembly removably mounted to a rear of the galley insert case, and air intake fascia configured to provide a flow path for air flow for ventilation of the galley insert.

\* \* \* \* \*